3,281,465
CONDENSATION PRODUCTS OF A FLUOROACETONE AND PHENOLS HAVING A BRIDGED PHENYL GROUP
Herbert C. Stecker, 1 Bridle Way, Ho-Ho-Kus, N.J.
No Drawing. Filed Nov. 15, 1963, Ser. No. 323,911
6 Claims. (Cl. 260—559)

This invention relates to novel and highly useful condensation products of a fluoroacetone and a phenol having a bridged phenyl group. More specifically, it deals with a reaction product of a fluoroacetone containing two to six fluorine atoms and a phenol, alone or substituted, connected by a bridge to a phenyl group, which may be free or substituted.

The reaction involved here may be outlined generally as follows:

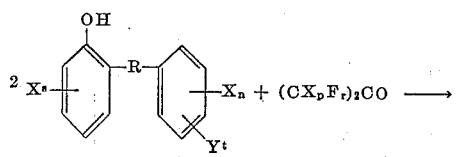

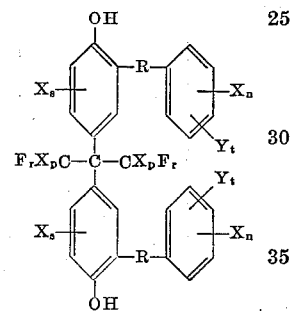

wherein:

R is a bridging radical of the class consisting of $$-\overset{O}{\underset{\|}{C}}-\overset{H}{\underset{|}{N}}-, \quad -S-, \quad \text{and} \quad -CH_2-$$

X is a substituent of the class consisting of hydrogen, chlorine, bromine and iodine,
Y is a substituent of the class consisting of hydrogen and —OH,
$n$ represents one of the digits 0, 1, 2, and 3,
$p$ represents one of the digits 0, 1 and 2, when $p$ plus $r$ equal 3,
$r$ represents one of the digits 1, 2, and 3, when $p$ plus equal 3, $s$ represents one of the digits 0, 1 and 2, and
$t$ represents one of the digits 0 and 1.

From the foregoing, it will be noted that the fluoroacetone reacting must contain one, two or three fluorine atoms per primary carbon atom, the other substituents being hydrogen, or another halogen, such as bromine, chlorine, and/or iodine. The other reactant must be a phenol, connected through a bridge, to an unsubstitued or substituted phenyl group, which may contain halogens as substituents, as well as a phenolic group.

A typical reaction, according to this invention is as follows:

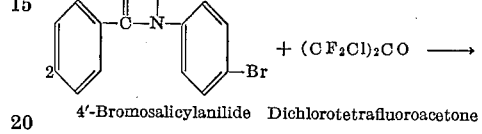

4'-Bromosalicylanilide    Dichlorotetrafluoroacetone

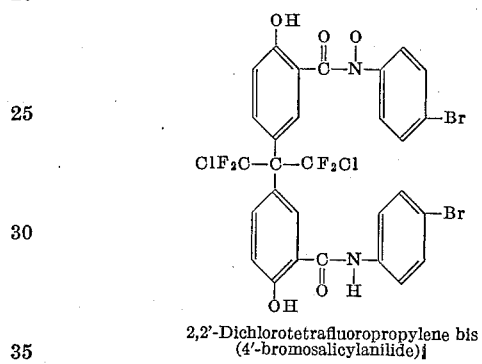

2,2'-Dichlorotetrafluoropropylene bis
(4'-bromosalicylanilide)

These compounds may be prepared in accordance with the following procedure:

*2,2'-dichlorotetrafluoropropylene bis (4'-bromosalicylanilide)*

About 22 moles of dichlorotetrafluoroacetone are added to a mixture of 1.0 mole of 4'-bromosalicylanilide and 15 moles of anhydrous hydrogen fluoride in a copper ampoule, cooled with Dry Ice. After sealing the ampoule, it is heated for 10 hours in a steam bath, after which the contents are poured into a copper vessel. The hydrogen fluoride is evaporated and the residue is crystallized from ethylene chloride to separate the product from unreacted bromosalicylanilide. Yields average about 70–80% of theory.

Table I lists examples of compound prepared in accordance with the present invention:

TABLE I

| No. | Compound | Formula | Analysis for Halogen (percent) | | | Percent Calculated | | |
|---|---|---|---|---|---|---|---|---|
| | | | F | Cl | Br | F | Cl | Br |
| 1 | 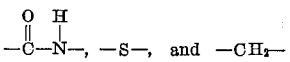 | $C_{29}H_{18}O_4N_2F_6Br_2$ (M.W. 732) | 15.5 | | 21.9 | 15.6 | | 21.8 |

TABLE I.—Continued

| No. | Compound | Formula | Analysis for Halogen (percent) | | | Percent Calculated | | |
|---|---|---|---|---|---|---|---|---|
| | | | F | Cl | Br | F | Cl | Br |
| 2 | [structure with OH, C(=O)NH-C6H4-Br groups, ClF2C–C–CF2Cl bridge] | $C_{29}H_{18}O_4N_2F_4Cl_2Br_2$ (M.W. 765) | 9.9 | 9.2 | 20.9 | 9.9 | 9.3 | 20.9 |
| 3 | [structure with OH, C(=O)NH-C6H4-Br groups, CFCl2–C–CFCl2 bridge] | $C_{29}H_{18}O_4N_2F_2Cl_4Br_2$ (M.W. 798) | 4.8 | 17.7 | 20.1 | 4.8 | 17.8 | 20.1 |
| 4 | [structure with OH, S, Cl groups, CF3–C–CF3 bridge] | $C_{27}H_{16}O_4S_2F_6Cl_4$ (M.W. 724) | 15.6 | 19.7 | | 15.7 | 19.6 | |
| 5 | [structure with OH, S, Cl groups, ClF2C–C–CF2Cl bridge] | $C_{27}H_{16}O_4S_2F_4Cl_6$ (M.W. 757) | 10.1 | 28.0 | | 10.0 | 18.1 | |
| 6 | [structure with OH, S, Cl groups, Cl2FC–C–CFCl2 bridge] | $C_{27}H_{16}O_4S_2F_2Cl_8$ (M.W. 790) | 4.8 | 35.8 | | 4.8 | 35.9 | |

TABLE I.—Continued
| No. | Compound | Formula | Analysis for Halogen (percent) | | | Percent Calculated | | |
|---|---|---|---|---|---|---|---|---|
| | | | F | Cl | Br | F | Cl | Br |
| 7 | 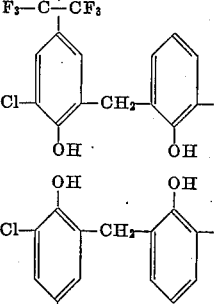 | $C_{29}H_{18}O_4F_6Cl_4$ (M.W. 686) | 16.7 | 20.6 | ---------- | 16.6 | 20.7 | ---------- |
| 8 | 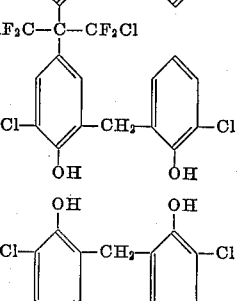 | $C_{29}H_{18}O_4F_4Cl_6$ (M.W. 719) | 10.6 | 29.7 | ---------- | 10.6 | 29.6 | ---------- |
| 9 | 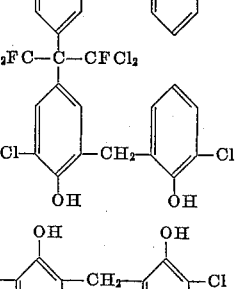 | $C_{29}H_{18}O_4F_2Cl_8$ | 5.1 | 37.9 | ---------- | 5.1 | 37.8 | ---------- |
| 10 | 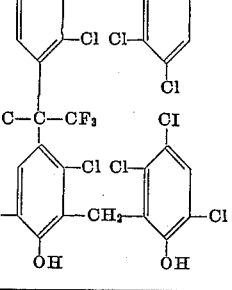 | $C_{29}H_{12}O_4F_6Cl_{10}$ (M.W. 893) | 12.5 | 39.6 | ---------- | 12.8 | 39.8 | ---------- |

These compounds have been found to have excellent activity against bacteria, and fungi, such as *S. aureus* and *A. niger*. Typical germicidal data are given in Table II:

TABLE II

| Compound No. from Table I | Minimum Inhibitory Concentration (p.p.m.) | |
|---|---|---|
| | S. aureus [1] | A. niger [2] |
| 1 | 0.7 | 8.0 |
| 2 | 0.7 | 8.0 |
| 3 | 0.7 | 8.0 |
| 4 | 0.6 | 8.0 |
| 5 | 0.6 | 8.0 |
| 6 | 0.6 | 8.0 |
| 7 | 0.6 | 7.5 |
| 8 | 0.5 | 7.5 |
| 9 | 0.5 | 7.5 |
| 10 | 0.5 | 7.5 |

[1] Minimum inhibitory concentration against *S. aureus* was determined as follows: Ten milligrams of each compound were dissolved in 1000 ml. of nutrient broth adjusted to pH 6.8. From each such dilution, 10 ml. dilutions were prepared in sterile broth varying in strength between 10 p.p.m. and 0.2 p.p.m., utilizing 20 tubes for each compound. Each dilution was inoculated with 0.1 ml. of a 24-hour old broth culture of *S. aureus*, and all tubes were read for density on a densitometer, and the values recorded. A control broth was inoculated. All tubes were inoculated at 37° C. for exactly 24 hours. Following inoculation, all tubes were re-read in the densitometer and, since growth of the organism creates turbidity, the higher the densitometer reading, the greater the growth. A turbidometric reading equal to that of the control would indicate no activity of the compound. A reading equal to that prior to incubation indicates 100% activity of the compound. The above results show the concentration at which increase in densitometer reading was observed.

[2] In determining the activity of the compounds against *A. niger*, agar plates were used in place of nutrient broth tubes, as in the case of testing antibacterial activity. The plates were prepared with concentrations of the compounds ranging from 1 p.p.m. to 10 p.p.m., utilizing 20 plates for each compound. The plates containing the lowest concentration of compound which inhibited fungal growth for 14 days at room temperature were considered as the end-point and, in cases where growth was doubtful between one concentration and the next higher, the reading was assumed to fall between such concentrations.

These compounds have been found to be excellent mildew-proofing and germicidal agents for fibrous materials such as cloth, leather, paper, wood, and the like. Treatment of fibrous material may be made with a solution or dispersion of the germicide in a liquid medium, leaving about 0.001% to 0.05%, or even 0.5%, or as much as 5.0% by weight of the germicide in the fibrous material.

The germicides of the present invention also may be incorporated in plastics, such as rubber, polyethylene, polystyrene, polyurethane, nylon, and similar plastoform and elastoform compositions by incorporating the germicide in an amount of 0.001% to 0.05% or even 0.1% or as much as 0.5% and 5.0% in the batch which is mixed or kneaded prior to vulcanization, extrusion or other forming operation.

The compounds of the present invention are particularly valuable in detergent and toilet detergent compositions, in the amount of 0.001% to 0.01% by weight, and to about 0.5% or even 1.0%, 2%, 5% or even 10%. They may be admixed in commercial toilet soaps, such as neutral high grade sodium and potassium salts of fatty acids from tallow, olive oil, palm oil, and the like, above or with non-soap synthetic detergents, e.g., non-ionic, anionic, or cationic.

The term "detergent" employed herein includes fatty acid soaps, as well as synthetic detergents, and other detergents, such as fatty alcohol sulfates, fatty acid amides, sodium tripolyphosphates, and combinations thereof. The term "toilet soap" used herein also is employed in its popular meaning, that is, those compositions employed for cleansing the skin and prepared from an alkali metal compound, such as potassium or sodium hydroxide and fat or fatty acid, both saturated and unsaturated. The compositions described herein also include other antiseptic agents, emollients, water softeners, antioxidants, dyes, perfume, "cold cream" additives, and the like.

The germicidal compounds of the present invention may be used with anionic detergents, such as sodium hexadecyl sulfate, or with cationic detergents, as exemplified by dimethyl-stearamidopropyl-2-hydroxyethyl ammonium dihydrogen phosphate, or with non-ionic detergents, such as polyoxypropylene, polyoxyethylene condensates, alone or in admixture with other detergents heretofore enumerated. They are also effective in scouring powders, detergent cleaners, and the like.

I claim:
1. A compound having the following generic formula:

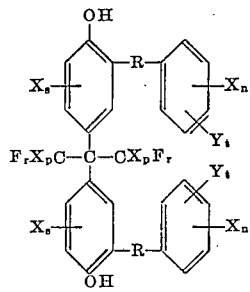

where:

R is a bridging radical of the class consisting of

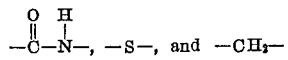

X is a substituent of the class consisting of hydrogen, chlorine, bromine, and iodine, Y is a substituent of the class consisting of hydrogen and —OH, $n$ represents one of the digits 0, 1, 2, and 3, $p$ represents one of the digits 0, 1, and 2, where $p$ plus $r$ equal 3, $r$ represents one of the digits 1, 2, and 3, when $p$ plus $r$ equal 3, $s$ represents one of the digits 0, 1, and 2, and $t$ represents one of the digits 0 and 1.

2.

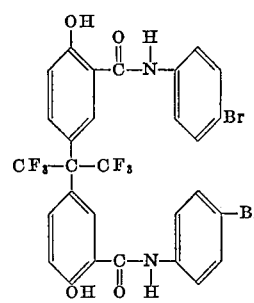

3.

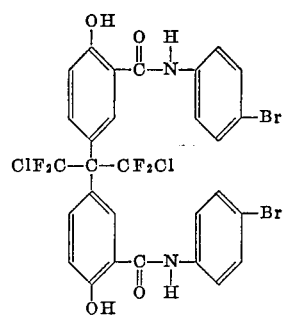

4.
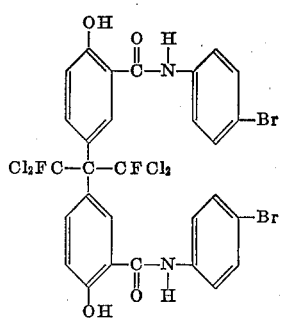
5.
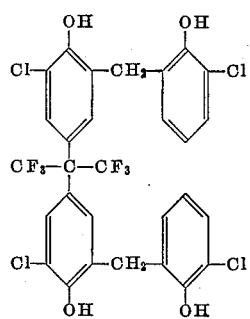
6.
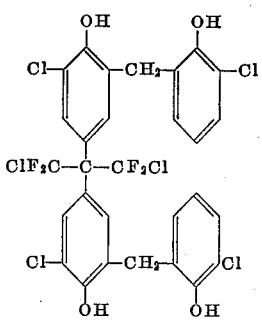
References Cited by the Examiner
UNITED STATES PATENTS
1,743,635   1/1930   Summers _____ 260—559
2,625,568   1/1953   Young et al. _____ 260—619
OTHER REFERENCES
Knunyants et al., Akademiia Nauk, U.S.S.R. Isvestiia Otedelenie Khim. 1960, page 689 relied on.
WALTER A. MODANCE, *Primary Examiner.*
NATALIE TROUSOF, *Assistant Examiner.*